UNITED STATES PATENT OFFICE.

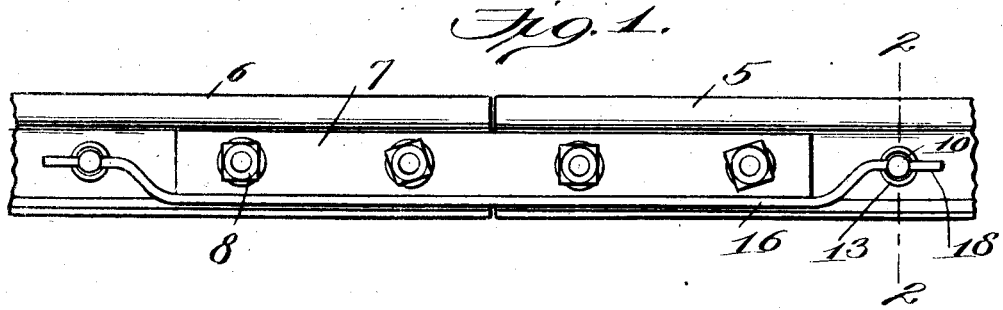
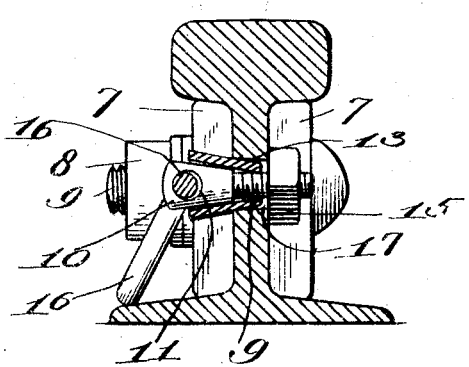
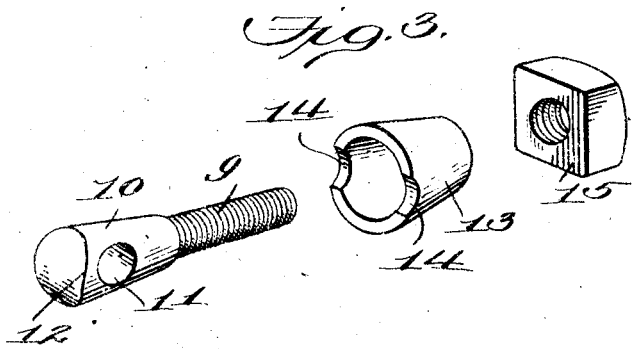

HARRY B. CONWAY, OF BOONE, WEST VIRGINIA, ASSIGNOR OF ONE-HALF TO LEE LONG, OF DANTE, VIRGINIA.

ELECTRICAL-RAIL BOND.

990,634.

Specification of Letters Patent. Patented Apr. 25, 1911.

Application filed November 7, 1910. Serial No. 591,135.

*To all whom it may concern:*

Be it known that I, HARRY B. CONWAY, a citizen of the United States, residing at Boone, in the county of Fayette and State of West Virginia, have invented new and useful Improvements in Electrical-Rail Bonds, of which the following is a specification.

This invention relates to an electrical rail bond, and the primary object of the same is to provide a device of this class of a simple and effective nature which may be readily attached to or detached from a rail and operating to reliably and positively establish a contact between the bonding wire and the rails.

With this and other objects and advantages in view the invention consists in the construction and arrangement of the several parts which will be more fully hereinafter described and claimed.

In the drawing: Figure 1 is a side elevation illustrating the united extremities of rails having the improved bond applied thereto. Fig. 2 is a transverse vertical section on the line 2—2, Fig. 1. Fig. 3 illustrates the bonding wire attaching means, the parts of the latter being separated and shown in perspective.

The numerals 5 and 6 designate rail sections adapted to constitute an electrical rail connected at their abutting ends by suitable fish plates 7 and bolts and nuts 8. The precise fastening or connecting means for the rail section extremities is not, however essential and may be modified at will. The bond embodying the features of the invention consists of a threaded bolt 9 having a tapered head 10 with an opening 11 extending transversely therethrough and a slightly flattened side 12 to facilitate application of the bolt, and a tubular bushing 13 of truncated conical form having diametrically opposed recesses 14 in the edge of the enlarged end thereof, and a securing nut 15. A bonding wire 16 is also included in the improved bond and extends downwardly and along the flanges of the rails at its intermediate portion. To accommodate the application of the bolt 9 and bushing 13, the webs of the rail sections 5 and 6 have openings 17 formed therethrough, one in each, at a short distance from the rail joint bolt openings, and in each opening 17 is inserted one of the bolts 9 with the bushing 13 thereover, as shown by Fig. 2, and after the extremity of the wire 16 has been inserted through the opening 11 in the tapering head of the bolt the latter is tightened up by application thereto of the nut 15 which is turned up tightly against the opposing side of the web of the rail to draw the tapering head 10 and at the same time tightly force the bushing 13 into the opening 17, each extremity 18 of the wire being longitudinally straight and held against movement by engaging the recesses or seats 14 at the outer or enlarged end of the bushing. Owing to the contour of the tapering head 10 of the bolt 9, said head becomes firmly jammed in the bushing 13 and the latter is preferably formed of metal that will establish a tight joint or contact at all points with the wall of the opening 17, the metal used in the formation of the bushing 13 being preferably copper. After the straight extremities 18 of the wire 16 are secured by the tapering head 10 of the bolt 9 within the recesses or seats 14 of the bushing, said wire will be prevented from turning or shifting out of place and the intermediate depressed portion thereof will be positively held on the rail flanges and with the specific fastening explained will form an effective bond for electrical rails. It will also be understood that the improved bond may be readily detached from the rails and at any time found necessary the bolts 9 may be tightened up through the medium of the nuts 15.

What is claimed as new is:

1. In an electrical rail bond, the combination with rail sections having openings therethrough, of a bolt having a tapered head with an opening extending transversely through the same and provided with a tapered bushing loosely fitted thereover and the bushing being equally tapered at its outer and inner surfaces, a bolt and bushing being inserted in each opening, a nut applied to each bolt for drawing the same and the bushing relatively to the opening, the reduced extremity of the bushing being drawn into the opening therefor in firm contact with the bolt and also with the adjacent portion of the wall of the opening, and a bonding wire having its extremities inserted through the openings of the bolts and held against the outer ends of the bushings.

2. In an electrical rail bond, the combination with rails having openings through the webs thereof, of a threaded bolt formed with a tapered head having an opening extending transversely therethrough and a tapering bushing thereon inserted in each rail web opening, the outer enlarged end of the bushing having diametrically opposed seats therein, a nut to engage each bolt, and a bonding wire having straight extremities inserted through the openings of the tapered heads of the bolts and drawn into the seats of the bushings, the intermediate portion of the wire being depressed and extending along the flanges of the connected rails.

In testimony whereof I have hereunto set my hand in presence of two subscribing witnesses.

HARRY B. CONWAY.

Witnesses:
 CLARENCE SHAWVER.
 THOS. GALLIAN.